J. PURCELL.
CRANK PIN TURNING MACHINE.
APPLICATION FILED AUG. 31, 1910.

1,059,635.

Patented Apr. 22, 1913.

7 SHEETS—SHEET 7.

UNITED STATES PATENT OFFICE.

JOHN PURCELL, OF TOPEKA, KANSAS.

CRANK-PIN-TURNING MACHINE.

1,059,635.  Specification of Letters Patent.  Patented Apr. 22, 1913.

Application filed August 31, 1910. Serial No. 579,933.

*To all whom it may concern:*

Be it known that I, JOHN PURCELL, of Topeka, in the county of Shawnee, and in the State of Kansas, have invented a certain new and useful Improvement in Crank-Pin-Turning Machines, and do hereby declare that the following is a full, clear, and exact description thereof.

The object of my invention has been to provide a portable machine for turning crank pins which shall have among other advantages that of being light, and yet being capable of doing accurate work and being put into operative position without being taken apart, and to such ends my invention consists in the portable crank-pin turning machine, hereinafter specified.

Specifically, my invention relates to a machine for turning a crank-pin projecting from the face of a wheel or crank arm so that it has one end free.

My invention is capable of embodiment in many different forms.

I have chosen for illustration that form which I regard as the best form known to me, but it is to be regarded as typical, only, of the many possible embodiments, and I am not to be limited to its specific details.

Figure 1:
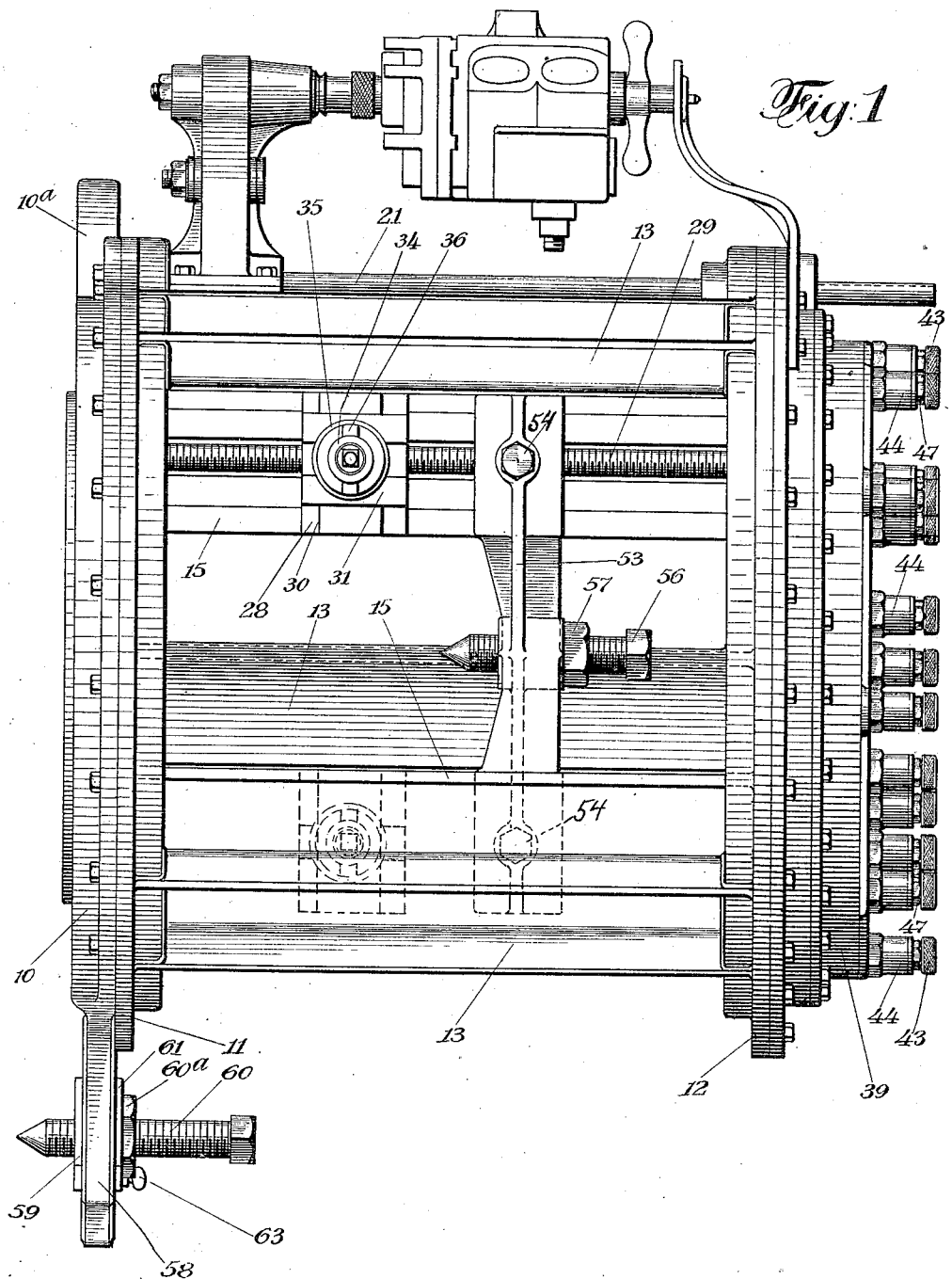
Figure 2:
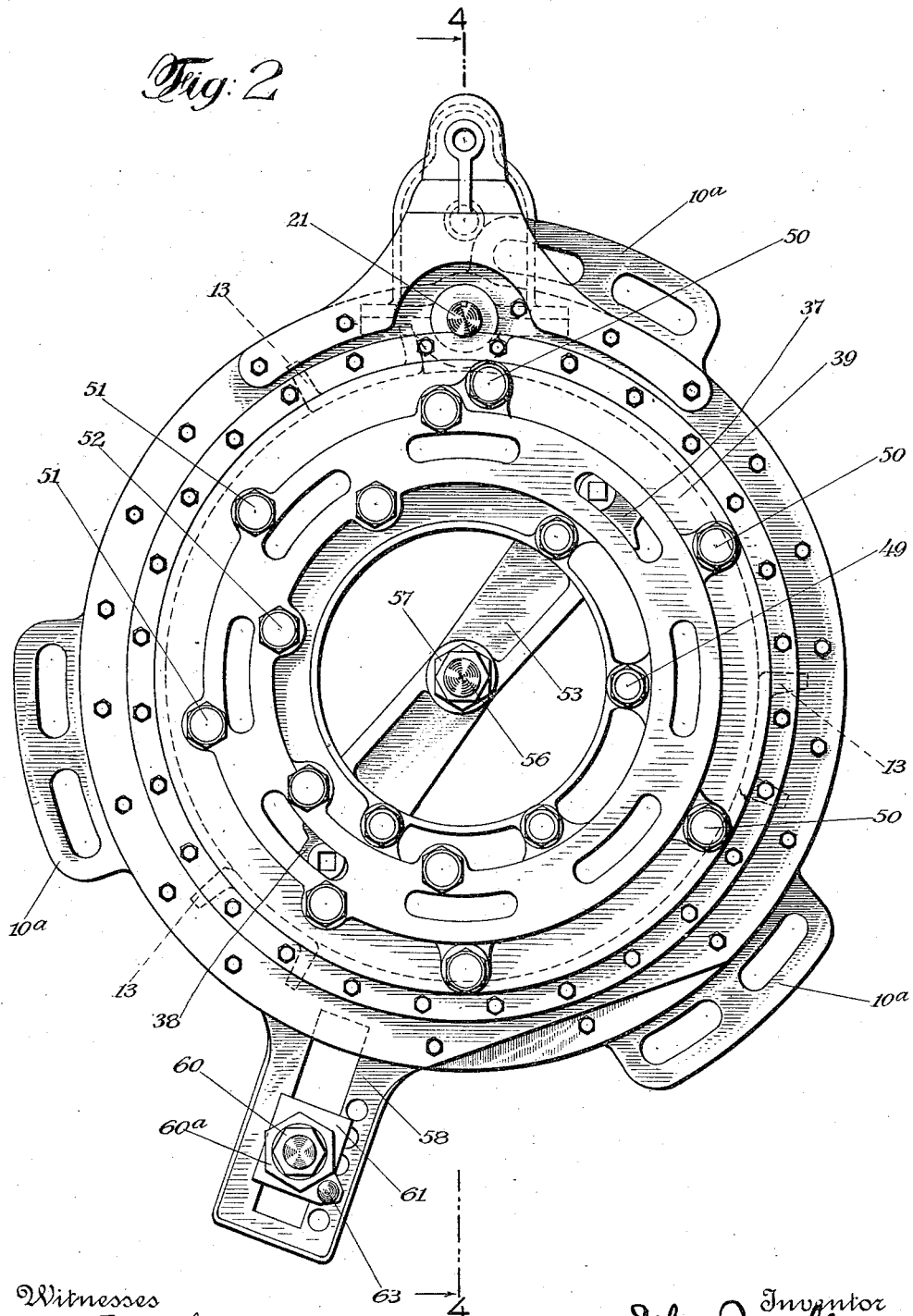
Figure 3:
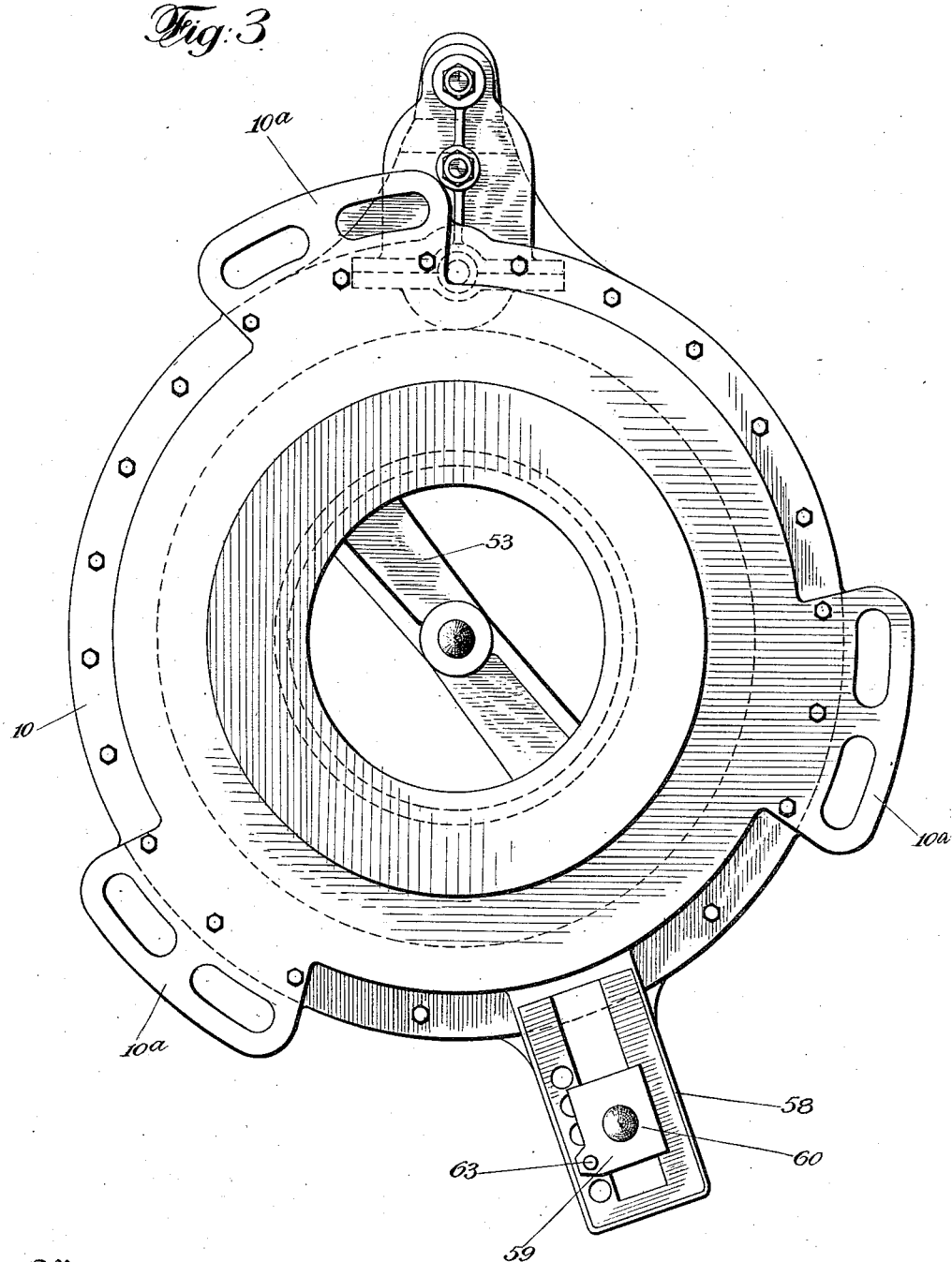
Figure 4:
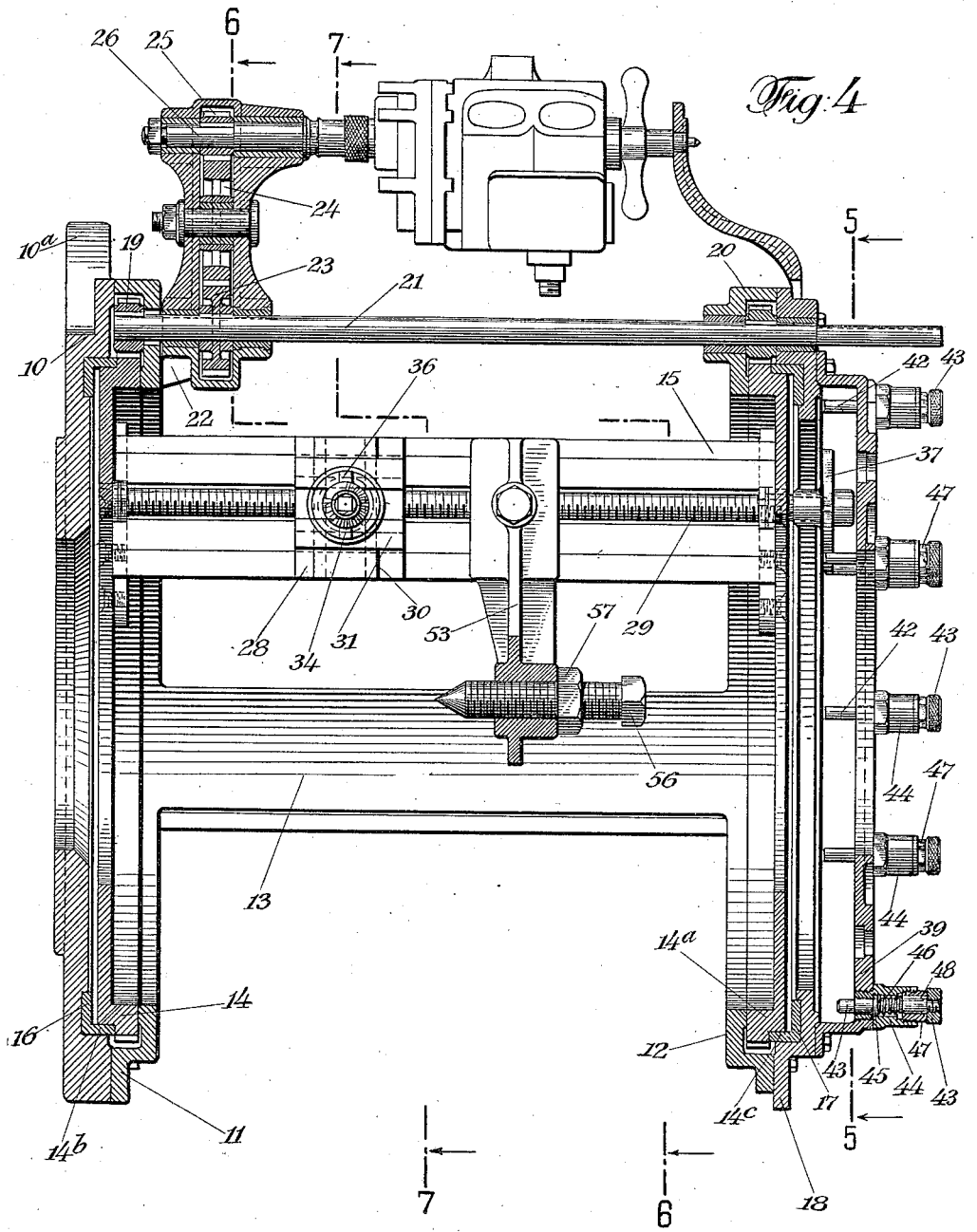
Figure 5:
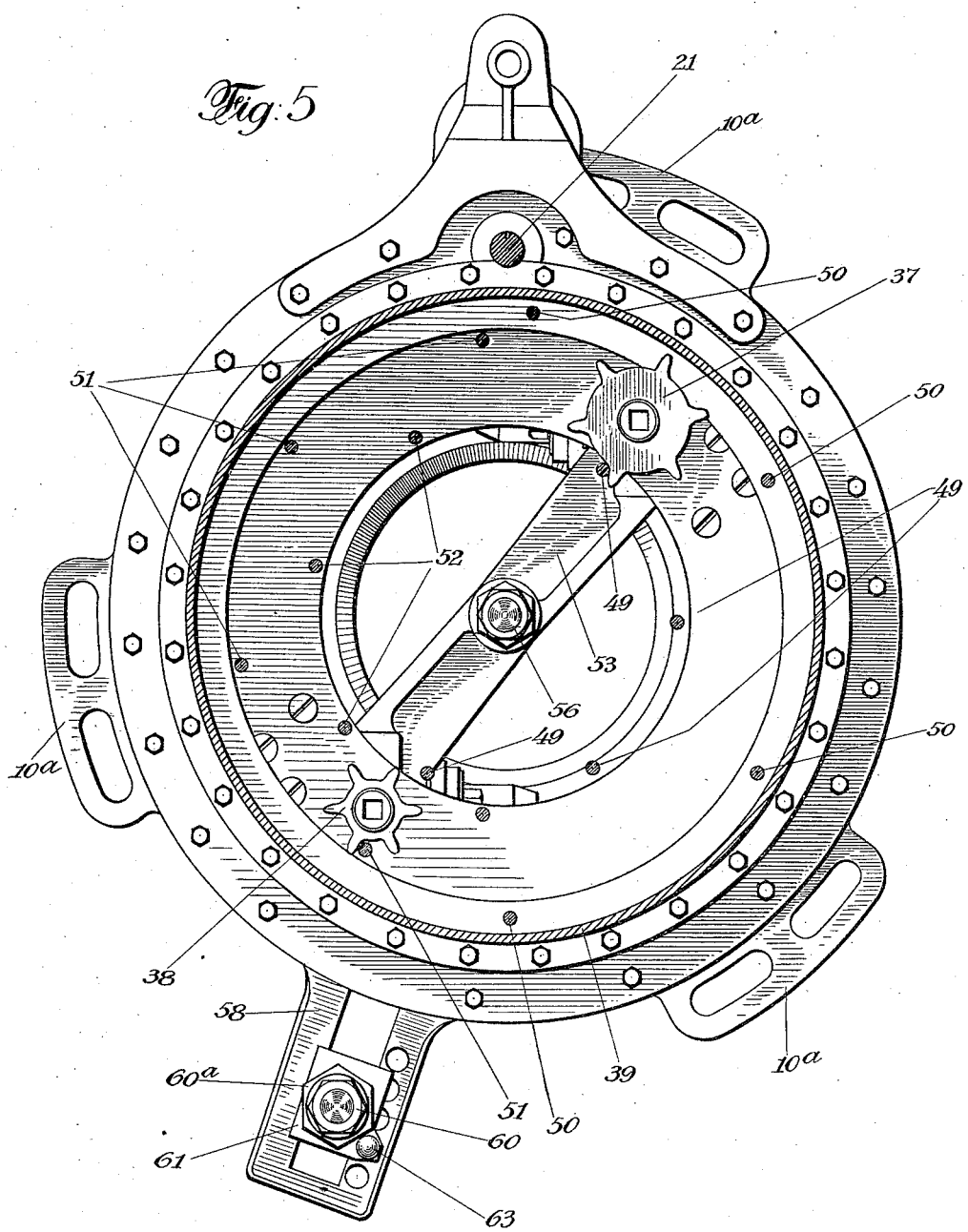
Figure 6:
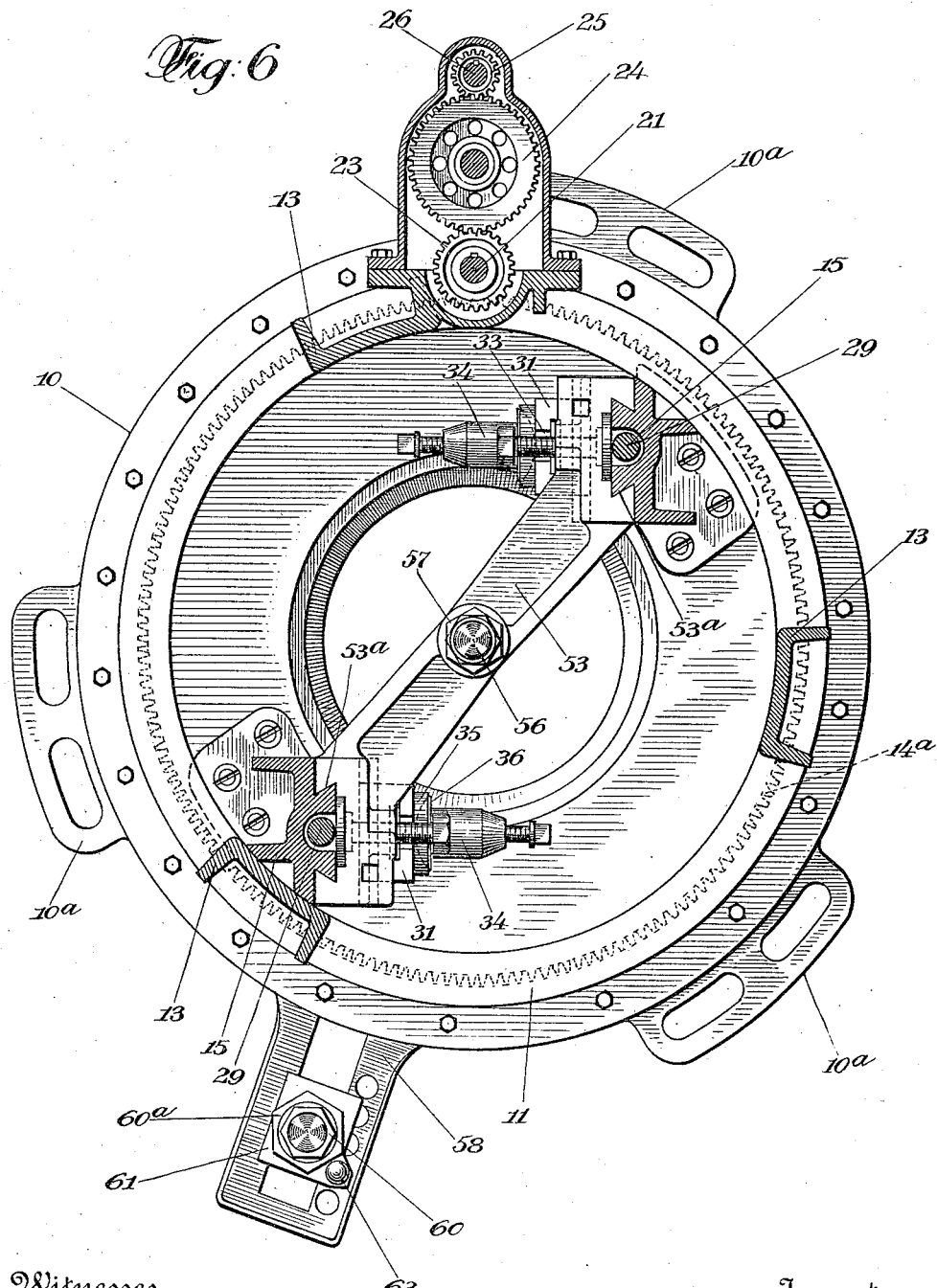
Figure 7:
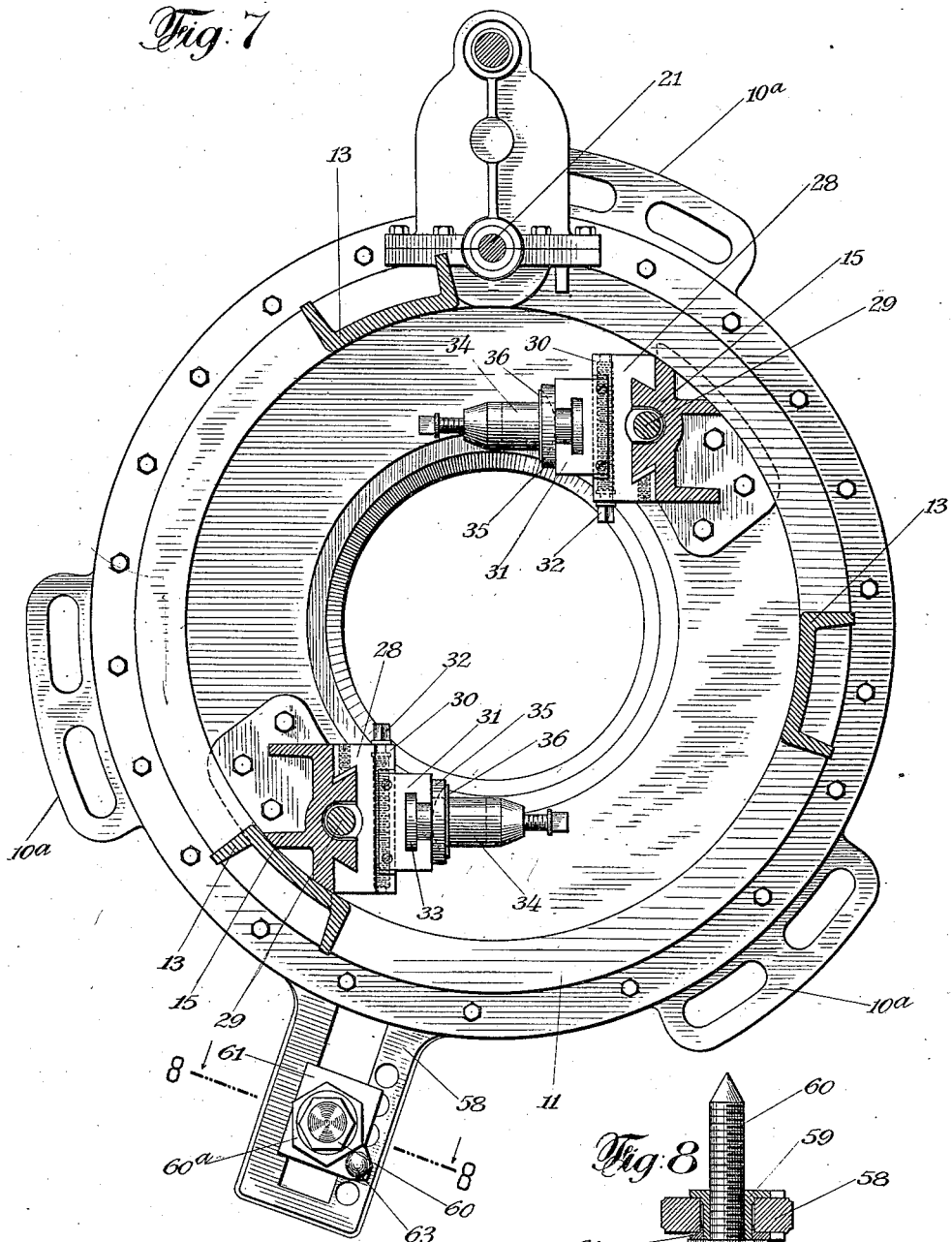
Figure 8:
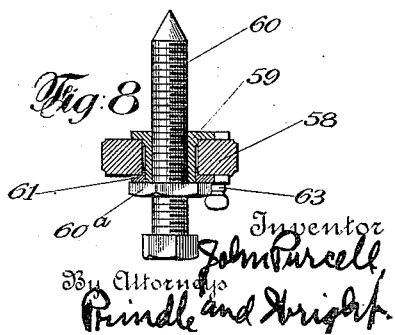

Figure 1 is a side elevation of a portable crank pin turning machine embodying my invention; Fig. 2 is a right-hand end elevation of Fig. 1; Fig. 3 is a left-hand end elevation of Fig. 1; Fig. 4 is a section on the line 4—4 of Fig. 2; Figs. 5, 6 and 7 are sections on the lines 5—5, 6—6 and 7—7 of Fig. 4, respectively; and Fig. 8 is a section on the line 8—8 of Fig. 7.

In a general way the illustrated embodiment of my machine consists of a hat shaped frame which is adapted to be put over the crank pin to be turned, as a hat is put over a head, and the frame preferably has a flange, like a hat brim, by which it is adapted to be secured to the wheel or crank from which the pin projects. Within the hat-shape frame, a cylindrical frame revolves about the crank pin and carries one or more tools, the tools being mounted on guide ways on which they are caused to travel parallel to the axis of the pin, so as to turn a spiral cutting off the pin. In order to utilize the strength of the crank pin so as to enable the frame to be made as light as possible, I support the outer end of the frame on the end of the crank pin.

In the accompanying drawings, what I have termed the hat-shaped frame comprises, first, the base plate 10 which is annular, and is provided with slotted ears 10ª by which it may be bolted to the machined hub of the wheel or crank. The said plate is also provided with a centering device to be later described. What corresponds to the cylindrical portion of the hat-shaped frame is a frame or cage consisting of rings 11 and 12, respectively, which are connected by bars 13, preferably 3 in number, extending parallel to the axis of the cylinder and cast in one piece with the said rings.

The inner, revolving tool-carrying frame consists of two annular gears 14 and 14ª, respectively, which are bolted to and connected by bars 15 that form guides for the tool carriages, later described. The said gears are provided with shoulders 14ᵇ and 14ᶜ, respectively, forming journals for the gears, which journals bear in bushings 16 and 17 that are respectively seated in the plate 10 and in a ring 18, the latter being bolted to the ring 12. A recess is formed between the plate 10 and the ring 11 for the gear 13 and a similar recess is formed between the ring 12 and the ring 18 for the gear 14, so that the said gears are provided with good bearings and are prevented in every direction from play.

The gears 14 and 14ª are driven by pinions 19 and 20, respectively, which are fast on a driving shaft 21 that is mounted in bearings formed in the frame of the machine. By thus driving both ends of the tool-carrying cage, I prevent any springing or torsion of such frame and insure a steady, perfect drive. I am, moreover, enabled to make such frame much lighter than would otherwise be possible. The driving shaft may be turned by hand or power. For the former purpose, I extend it beyond the frame so that a crank may be attached thereto. In order to provide for gearing for turning the driving shaft by power, I preferably cast a lug 22 on the main frame to form part of and support a gear case. Within such case a gear 23 is keyed on the driving shaft, and an idler 24 (mounted on a pin supported by said gear case) drives the said gear. A motor pinion 25 is keyed on the motor shaft 26 which is journaled in the gear case. The free end of the motor shaft is preferably tapered so as to be readily attached to the usual portable pneumatic or electric motor 27.

Referring now to the manner of mounting and driving the tools: The bars 15 of the inner, revolving cage have dove-tailed guides formed on their sides facing in the direction of rotation, and on each of such guides is mounted a main tool slide 28, the usual gibs and tightening screws being provided. Each bar 15 is provided with a lead or feed screw 29 connected to its tool slide in the usual manner and by which the tool slide is moved. Each tool slide has formed on its face a dove-tailed guide 30 at right angles to its bar 15, the faces of the guides 30 thus extending transverse to the axis of rotation of the tool carriage. On each guide 30 is mounted a cross-feed block 31, and a cross feed screw 32 is journaled in the tool slide and engages the cross-feed block so that the latter may be adjusted for the depth of the cut. These screws are preferably adjusted by hand. The slots 33 are formed in the cross-feed blocks to receive the bases of the tool-posts 34 in the usual manner, the usual concave rings 35 and rocker-pieces 36 being provided.

The main feed-screws 29 are automatically driven in the following manner: They are extended through and beyond the ring 18 and there have attached thereon star-wheels 37 and 38, respectively. A ring or cover plate 39 is bolted to the ring 18 over and outside of the star-wheels. In order to turn the star-wheels, certain stop-pins 41 are mounted in the cover plate. Each stop-pin comprises a pin, proper, 42 having a knurled head 43. The pin 42 is mounted in a bushing 44 that is threaded into the cover plate. The pin 42 is provided with a shoulder 45 against which bears a spring 46, the spring being held down against the shoulder by a cap or sleeve 47 that is screwed into the upper end of the bushing. The pin 42 carries a lug 48 and the cap 47 has a slot formed therein through which the said lug is adapted to pass. Thus by turning the lug 48 into line with the slot, the stop pin can be forced down against the stress of the spring and thus put into position to engage the teeth of a star wheel as it passes, or by turning the lug into line with the slot and permitting the spring to throw the stop pin outward until the lug has passed through and above the slot, the stop pin can be raised out of the path of the star wheel teeth and thus rendered inoperative.

I wish to render the star wheels independently operable so that the tools can be used for instance, to turn crank-pins having two bearings of different diameters to accommodate two separate connecting rods, one tool turning one bearing while the other tool turns the other bearing, and both tools working in either direction. To accomplish this, I make one star wheel, as 37, larger and at a lower level than the other star wheel as 38, but the axes of such wheels are preferably at the same radial distances from the main axis of the machine. By the term "lower level," I mean a greater distance from the pin-supporting ring 39. I then provide a series of stops 49, which are at such a radial distance and which have such length that when forced downward, they stand in the path of those teeth of the larger wheel 37 which project toward the center. I also provide a series of stops 50 placed at such radial distance and of such a length when forced in, that they may stand in the path of the teeth of the larger star-wheel when those teeth project outwardly. These series of stops 49 and 50 are respectively too near the center and too far from the center to engage the teeth of the smaller star-wheel. When one series is used, the larger wheel turns to the right and when the other series is used, it turns to the left. The speed of turning depends on the number of stops in action in a series. In order to prevent the breakage that would result if the wheel contacted with stops on both sides of the center at the same time, I stagger the stops of the two series and thus, if inadvertently stops of both series be thrown into action, the only result would be to turn the star wheel alternately in one direction and the other. Similarly to the larger star wheel, the smaller star wheel 38 is provided with an inner and an outer set of stops 51 and 52, respectively, and these stops are only long enough to engage the teeth of the small star wheel and do not extend far enough to touch the larger star wheel.

By the described arrangement it is possible to cause either star wheel to operate independently of the other and to cause either one to rotate in either direction.

I support my machine on the outer end of the crank pin, and the particular manner in which I carry out my idea is to provide a cross-brace 53 which is provided with dove-tailed slots 53ᵃ that are adapted to receive and engage the dove tails on the bars 15 of the revolving cage, the arms of the cross-brace being clamped on the dove tails by the bearing of screws 54 (threaded into such arms) on plates or gibs seated in slots in the said arms. A centering screw 56 is threaded into the cross-brace and is provided with a lock nut 57. The cross-brace can thus be slid along the bars until the centering screw is near the center in the crank pin end, and then the brace can be secured to the bars, and the screw can be screwed home and locked by the nut. I also provide a centering device to engage the center in the shaft crank or wheel-hub. In forming this latter device in the illustrated form of my invention I provide the base plate 10 with an arm 58 which has a slot formed therein in which is mounted a male block 59 having a base that fits the under side of the arm 58 and the slot therein and having a post or sleeve that extends through the slot and has the centering screw 60 threaded therein. The latter is provided with a lock nut 61. A female block 61 fits over the post of the block 60 bears on the upper side of the arm 58 and fits the slot therein. A nut 62 is threaded on the post and serves to clamp the blocks against the opposite sides of the arm. A tapered pin 63 is mounted in a hole or holes formed in one or both of the said blocks and engages any one of a series of holes formed in the arm at definite distances from the axis of the machine (or from the centering screw 56) and thus the throw of the crank to be turned can be accurately fixed by engagement of the pin 63 with the proper hole in the arm.

In the operation of my machine, as above illustrated, to turn the crank pin of a locomotive or stationary engine, the machine is placed over the free end of the crank pin, the latter entering the machine through the opening in the base plate and through the hole in the lower annular gear of the revolving cage. The cross-brace is either free to slide on the bars 15 or it is withdrawn so that its centering screw is out of contact with the crank. Bolts are then passed through the arm 10ª and the base plate loosely clamped against the machined face of the crank boss or disk. The machine is then shifted until the centering screw 60 (which has previously set to agree with the desired throw of the crank) is made to enter perfectly into the center of the crank or axle. The machine is then further shifted until the centering screw in the cross brace is made to enter into the center in the outboard end of the crank pin, when the machine is finally and firmly clamped to the crank boss or disk. The cutters are then set at the proper radial distance for the depth of cut desired, the proper stops are put into position to engage the star wheels and the driving shaft being rotated, the cage is revolved and the cutters turn the pin.

It will be observed that I have provided a comparatively simple machine which can be made so light as to be readily portable and yet which is so sustained by the crank and crank pin on which it is operating as to be exceedingly rigid and thus capable of doing accurate and heavy work. It will also be observed that my machine is capable of automatically feeding the cutters both forward and backward along the crank pin so that there need be no time-consuming idle back stroke of the cutters, and that it is capable of turning two independent bearing surfaces at the same time. My machine can be placed in position for work and removed therefrom without disassembling any of its parts.

It is obvious various changes can be made in the above illustrated embodiment of my invention which will be within the scope of my invention and I desire not to be limited beyond the requirements of the prior art and the necessary intendment of my claims.

I claim:

1. In a machine for turning crank pins; the combination of a stationary outer cage, an inner cage journaled in said outer cage, said cages having concentric openings adapted to receive a crank pin, means for supporting said frame on the free end of a crank pin, gears, one at each end of said inner cage, a shaft journaled on said outer cage, pinions mounted on said shaft and meshing with said gears and a cutter mounted on said inner cage.

2. In a machine for turning crank pins, the combination of a rotatable tool carrier, a plurality of tool slides mounted on said carrier, feed screws for each of said slides, a star wheel mounted on each of said feed screws, one of said star wheels being larger than the other and farther from the hereinafter mentioned stop support, a stop support and separate stops for rotating each of said wheels, the stops for the larger wheel being farther from the path of travel of the axes of said wheels, the stops of the smaller wheel not extending to the plane of the larger wheel.

3. In a machine for turning crank pins, the combination of a rotatable tool carrier, a plurality of tool slides mounted on said carrier, feed screws for each of said slides, a star wheel mounted on each of said feed screws, one of said star wheels being larger than the other and farther from the hereinafter mentioned stop support, a stop support and separate stops for rotating each of said wheels, the stops for the larger wheel being farther from the path of travel of the axes of said wheels, the stops of the smaller wheel not extending to the plane of the larger wheel, each of said wheels having two sets of stops, one for each side thereof.

4. In a machine for turning crank pins, the combination of a rotatable tool carrier, a plurality of tool slides mounted on said carrier, feed screws for each of said slides, a star wheel mounted on each of said feed screws, one of said star wheels being larger than the other and farther from the hereinafter mentioned stop support, a stop support and separate stops for rotating each of said wheels, the stops for the larger wheel being farther from the path of travel of the axes of said wheels, the stops of the smaller wheel not extending to the plane of the larger wheel, each of said wheels having two sets of stops, one for each side thereof, the stops for the sets of each wheel being staggered.

5. In a machine for turning crank pins, the combination of a rotatable tool carrier, a plurality of tool slides mounted on said carrier, feed screws for each of said slides, said feed screws being at the same distance from the axis of said carrier, each of said feed screws having a star wheel, one of said wheels being of larger diameter and farther from the hereinafter mentioned stop support than the other of said wheels, a stop-support, and stops, there being two sets of stops for each of said star wheels, the stops of the smaller star wheel not extending to the plane of travel of the larger wheel and being closer to the path of said screws than the stops for the other of said star wheels.

6. In a machine for turning crank pins, the combination of a rotatable tool carrier, a plurality of tool slides mounted on said carrier, a feed screw for each of said tool slides, said feed screws being at the same distance from the axis of the carrier, each of said feed screws having a star wheel, one of said wheels being of larger diameter and farther from the hereinafter mentioned stop support than the other, a stop support, two sets of stops for each of said star wheels, the stops of the smaller wheel being closer to the path of said screw than the stops of the larger wheel, the stops of the sets of each wheel being staggered.

7. In a machine for turning crank pins, the combination of a frame adapted to fit over a projecting crank pin, a rotatable tool carrier mounted within said frame, guides on said carrier parallel to its axis, a slide mounted on said guides, and a center in said slide.

8. In a machine for turning crank pins, the combination of a frame adapted to fit over a projecting crank pin, a rotatable tool carrier mounted within said frame, guides on said carrier parallel to its axis, a slide mounted on said guides, and a center screw threaded in said slide in the line of the axis of said carrier.

9. In a machine for turning crank pins, the combination of a frame adapted to fit over a projecting crank pin, a rotatable tool carrier mounted within said frame, a slide for supporting a dead center, and means whereby said slide may be adjusted toward and from the end of the crank pin over which said frame may be fitted.

In testimony that I claim the foregoing, I have hereunto set my hand.

JOHN PURCELL.

Witnesses:
  H. LARIMER,
  DAVID H. OWEN.

---

Copies of this patent may be obtained for five cents each, by addressing the "Commissioner of Patents, Washington, D. C."